(12) United States Patent
Yang

(10) Patent No.: US 10,425,532 B2
(45) Date of Patent: *Sep. 24, 2019

(54) METHOD AND APPARATUS FOR STORING PHONE NUMBER, AND METHOD AND APPARATUS FOR DIALING PHONE NUMBER

(71) Applicant: Huawei Technologies Co., Ltd., Shenzhen (CN)

(72) Inventor: Fen Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,243

(22) Filed: Jan. 3, 2018

(65) Prior Publication Data

US 2018/0131807 A1  May 10, 2018

Related U.S. Application Data

(63) Continuation of application No. 15/650,491, filed on Jul. 14, 2017, now Pat. No. 9,894,200, which is a
(Continued)

(51) Int. Cl.
*H04M 3/00* (2006.01)
*H04M 5/00* (2006.01)
(Continued)

(52) U.S. Cl.
CPC .......... *H04M 3/493* (2013.01); *H04M 3/527* (2013.01); *H04M 3/53* (2013.01); *H04M 19/04* (2013.01);
(Continued)

(58) Field of Classification Search
CPC ... H04M 2203/158; H04M 2203/2033; H04M 3/42102; H04M 3/5141; H04M 3/42221; H04M 3/4211
(Continued)

(56) References Cited

U.S. PATENT DOCUMENTS 5,557,667 A * 9/1996 Bruno ................. H04M 3/4228
348/14.01
5,909,484 A  6/1999 Kim
(Continued)

FOREIGN PATENT DOCUMENTS

CN  1774017 A  5/2006
CN  1964402 A  5/2007
(Continued)

OTHER PUBLICATIONS

Foreign Communication From a Counterpart Application, Chinese Application No. 201580003601.0, Chinese Office Action dated May 14, 2018, 12 pages.
(Continued)

*Primary Examiner* — Thjuan K Addy
(74) *Attorney, Agent, or Firm* — Conley Rose, P.C.

(57) ABSTRACT

A method and an apparatus for dialing a phone number, where the method for dialing the phone number includes obtaining, by a communications terminal from a number record of a called party, root-level number information of the called party, number information of sub-levels 1 to j, and a relationship between the root-level number information and the number information of sub-levels 1 to j, calling the called party for the second time according to the root-level number information, and sending, according to a relationship between the root-level number information and sub-level i number information, the sub-level i number information corresponding to an $i^{th}$ input prompt of the called
(Continued)

party after the second call succeeds, where i≥1 and i≤j. Therefore, information can be automatically entered to the called party according to an input prompt of the called party.

20 Claims, 7 Drawing Sheets

Related U.S. Application Data continuation of application No. PCT/CN2015/070674, filed on Jan. 14, 2015.

(51) Int. Cl.
*H04M 3/42* (2006.01)
*H04M 3/493* (2006.01)
*H04M 3/527* (2006.01)
*H04M 3/53* (2006.01)
*H04M 19/04* (2006.01)

(52) U.S. Cl.
CPC .. *H04M 2201/40* (2013.01); *H04M 2203/254* (2013.01); *H04M 2250/68* (2013.01); *H04M 2250/74* (2013.01)

(58) Field of Classification Search
USPC ....... 379/242, 265.01, 245, 252, 251, 266.1, 379/201.11, 201.07, 207.15, 210.01
See application file for complete search history.

(56) References Cited

U.S. PATENT DOCUMENTS

| | | | |
|---|---|---|---|
| 6,249,577 | B1 | 6/2001 | Baldwin |
| 2005/0147219 | A1 | 7/2005 | Comerford |
| 2006/0072553 | A1 | 4/2006 | Miyajima et al. |
| 2007/0036288 | A1* | 2/2007 | Parikh ............... H04Q 3/0016 379/88.02 |
| 2008/0069314 | A1 | 3/2008 | Lewis et al. |
| 2010/0274563 | A1 | 10/2010 | Malo et al. |
| 2011/0188644 | A1 | 8/2011 | Skinner |
| 2013/0022191 | A1 | 1/2013 | Or-Bach et al. |
| 2013/0078974 | A1 | 3/2013 | Malo et al. |
| 2014/0348311 | A1 | 11/2014 | Chang |

FOREIGN PATENT DOCUMENTS

| | | |
|---|---|---|
| CN | 104010095 A | 8/2014 |
| CN | 104182031 A | 12/2014 |
| JP | S6478060 A | 3/1989 |
| JP | H1013519 A | 1/1998 |
| JP | 2002218040 A | 8/2002 |
| JP | 2006279295 A | 10/2006 |
| JP | 2012049797 A | 3/2012 |
| KR | 20080045542 A | 5/2008 |
| KR | 101044045 B1 | 6/2011 |

OTHER PUBLICATIONS

Machine Translation and Abstract of Chinese Publication No. CN1964402, May 16, 2007, 6 pages.
Machine Translation and Abstract of Chinese Publication No. CN104010095, Aug. 27, 2014, 19 pages.
Tencent Technology, "Apple invented visual menu system patent terminating call center IVR nightmare" May 20, 2014, 2 pages.
English Translation of Tencent Technology, "Apple invented visual menu system patent terminating call center IVR nightmare" May 20, 2014, 2 pages.
Foreign Communication From a Counterpart Application, European Application No. 15877423.2, Extended European Search Report dated Dec. 1, 2017, 8 pages.
Foreign Communication From a Counterpart Application, PCT Application No. PCT/CN2015/070674, English Translation of International Search Report dated Oct. 19, 2015, 2 pages.
Foreign Communication From a Counterpart Application, PCT Application No. PCT/CN2015/070674, English Translation of Written Opinion dated Oct. 19, 2015, 8 pages.
Foreign Communication From a Counterpart Application, Chinese Application No. 201580003601.0, Chinese Office Action dated Dec. 13, 2018, 11 pages.
Machine Translation and Abstract of Korean Publication No. KR101044045, Jun. 23, 2011, 17 pages.
Machine Translation and Abstract of Korean Publication No. KR20080045542, May 23, 2008, 15 pages.
Foreign Communication From a Counterpart Application, Korean Application No. 10-2017-7022265, Korean Office Action dated Jun. 20, 2018, 6 pages.
Foreign Communication From a Counterpart Application, Korean Application No. 10-2017-7022265, English Translation of Korean Office Action dated Jun. 20, 2018, 9 pages.
Machine Translation and Abstract of Japanese Publication No. JP2006279295, Oct. 12, 2006, 25 pages.
Machine Translation and Abstract of Japanese Publication No. JP2012049797, Mar. 8, 2012, 23 pages.
Foreign Communication From a Counterpart Application, Japanese Application No. 2017-537240, Japanese Office Action dated Oct. 5, 2018, 6 pages.
Foreign Communication From a Counterpart Application, Japanese Application No. 2017-537240, English Translation of Japanese Office Action dated Oct. 5, 2018, 7 pages.
Machine Translation and Abstract of Japanese Publication No. JP2002218040, Aug. 2, 2002, 17 pages.
Machine Translation and Abstract of Japanese Publication No. JPS6478060, Mar. 23, 1989, 7 pages.
Foreign Communication From a Counterpart Application, Japanese Application No. 2017-537240, Japanese Office Action dated Feb. 4, 2019, 5 pages.
Foreign Communication From a Counterpart Application, Japanese Application No. 2017-537240, English Translation of Japanese Office Action dated Feb. 4, 2019, 7 pages.

* cited by examiner

METHOD AND APPARATUS FOR STORING PHONE NUMBER, AND METHOD AND APPARATUS FOR DIALING PHONE NUMBER

CROSS-REFERENCE TO RELATED APPLICATIONS

This application is a continuation of U.S. patent application Ser. No. 15/650,491 filed on Jul. 14, 2017, which is a continuation of International Patent Application No. PCT/CN2015/070674 filed on Jan. 14, 2015. Both of the aforementioned applications are hereby incorporated by reference in their entireties.

TECHNICAL FIELD

This application relates to the field of communications technologies, and in particular, to a method and an apparatus for storing a phone number, and a method and an apparatus for dialing a phone number.

BACKGROUND

When a user makes a call to a service desk manager such as 10086, after being successfully called, the service desk manager generally sends a series of voice broadcast announcements for a communications terminal, and the user enters corresponding information according to the voice announcements in order to enter a corresponding process. In this way, a call to the service desk manager for a specific service can be implemented after a series of inputs are performed step by step according to the voice announcements. For example, if the user wants to dial 10086 to query a call cost, after successfully calling 10086, the user may enter the call cost query by selecting "1" according to a voice announcement sent by the service desk manager to enter a Mandarin service, and then selecting "1" according to another voice announcement sent by the service desk manager. The process is extremely complex. In addition, a voice announcement sent by the service desk manager is generally excessively long and difficult to hear clearly. If a user needs to frequently query a call cost, during each query, the user is required to perform manual inputs step by step according to voice announcements. This process is extremely complex, thereby resulting in low manipulation efficiency.

SUMMARY

This application provides a method and an apparatus for storing a phone number, and a method and an apparatus for dialing a phone number in order to automatically enter information to a called party according to an input prompt of the called party.

A first aspect of this application provides a method for storing a phone number, including obtaining, by a communications terminal, a unified access number after a called party is successfully called for the first time according to the unified access number entered by a user, and setting the unified access number as root-level number information, obtaining information entered by the user according to an $n^{th}$ input prompt, and setting the information entered by the user according to the $n^{th}$ input prompt as sub-level n number information when the $n^{th}$ input prompt sent by the called party is received, where $n \geq 1$, and saving the root-level number information, the sub-level n number information, and a relationship between the root-level number information and the sub-level number information as a number record of the called party such that when the called party is called for the second time, the corresponding sub-level number information in the number record is automatically sent to the called party according to an input prompt of the called party.

With reference to the first aspect, in a first possible implementation manner of the first aspect, setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information.

With reference to the first aspect or the first possible implementation manner of the first aspect, in a second possible implementation manner of the first aspect, the method further includes obtaining number version information sent by the called party, where the number version information is used to determine whether the input prompt of the called party is updated, and adding the number version information to the number record of the called party.

With reference to any one of the first aspect, or the first to the second possible implementation manners of the first aspect, in a third possible implementation manner of the first aspect, the method further includes obtaining text information represented by the sub-level n number information, and saving the root-level number information, the sub-level n number information, and a relationship between the root-level number information and the sub-level number information as a number record of the called party includes saving the root-level number information, the sub-level n number information, the relationship between the root-level number information and the sub-level n number information, and the text information represented by the sub-level n number information as the number record of the called party, and displaying the sub-level n number information and/or the text information represented by the sub-level n number information.

With reference to any one of the first aspect, or the first to the third possible implementation manners of the first aspect, in a fourth possible implementation manner of the first aspect, the number record of the called party is saved using a call record and/or an address book.

A second aspect of this application provides a method for dialing a phone number, including obtaining, by a communications terminal from a number record of a called party, root-level number information of the called party, number information of sub-levels 1 to j, and a relationship between the root-level number information and the number information of sub-levels 1 to j, where the root-level number information is a unified access number of the called party, the sub-level j number information is information entered by a user according to a $j^{th}$ input prompt of the called party when the called party is successfully called for the first time, and j is determined by a preset rule or user selection and is less than or equal to a total quantity of sub-levels in the number record, calling the called party for the second time according to the root-level number information, and sending, according to a relationship between the root-level number information and sub-level i number information, the sub-level i number information corresponding to an $i^{th}$ input prompt of the called party after the second call succeeds, where $i \geq 1$ and $i \leq j$.

With reference to the second aspect, in a first possible implementation manner of the second aspect, before obtaining, from a number record of a called party, root-level number information of the called party, number information of sub-levels 1 to j, and a relationship between the root-level number information and the number information of sub-levels 1 to j, the method further includes obtaining the unified access number after the called party is successfully called for the first time according to the unified access number entered by the user, and setting the unified access number as the root-level number information, obtaining information entered by the user according to the $n^{th}$ input prompt, and setting the information entered by the user according to the $n^{th}$ input prompt as sub-level n number information when an $n^{th}$ input prompt sent by the called party is received, where $n \geq 1$, and saving the root-level number information, the sub-level n number information, and a relationship between the root-level number information and the sub-level number information as the number record of the called party.

With reference to the first possible implementation manner of the second aspect, in a second possible implementation manner of the second aspect, setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information, and sending the sub-level i number information corresponding to an $i^{th}$ input prompt of the called party includes prompting the user to enter information, and sending the information entered by the user to the called party when the sub-level i number information corresponding to the $i^{th}$ input prompt of the called party is a preset privacy identifier, or sending the sub-level i number information to the called party when the sub-level i number information corresponding to the $i^{th}$ input prompt of the called party is not a preset privacy identifier.

With reference to either of the first to the second possible implementation manners of the second aspect, in a third possible implementation manner of the second aspect, after obtaining information entered by the user according to the $n^{th}$ input prompt, and setting the information entered by the user according to the $n^{th}$ input prompt as sub-level n number information, the method further includes obtaining text information represented by the sub-level n number information, and saving the root-level number information, the sub-level n number information, and a relationship between the root-level number information and the sub-level number information as the number record of the called party includes saving the root-level number information, the sub-level n number information, the relationship between the root-level number information and the sub-level n number information, and the text information represented by the sub-level n number information as the number record of the called party, and displaying the sub-level n number information and/or the text information represented by the sub-level n number information.

With reference to any one of the second aspect, or the first to the third possible implementation manners of the second aspect, in a fourth possible implementation manner of the second aspect, sending the sub-level i number information corresponding to an $i^{th}$ input prompt of the called party includes sending the sub-level i number information to the called party after a delay of an $i^{th}$ preset time, or sending the sub-level i number information to the called party when an input prompt sent by the called party is received for the $i^{th}$ time, or sending the sub-level i number information to the called party when an input prompt sent by the called party is identified for the $i^{th}$ time by means of speech recognition.

With reference to any one of the second aspect, or the first to the fourth possible implementation manners of the second aspect, in a fifth possible implementation manner of the second aspect, before sending, according to a relationship between the root-level number information and sub-level i number information, the sub-level i number information corresponding to an $i^{th}$ input prompt of the called party, the method includes obtaining number version information of the called party from the number record of the called party, where the number version information is saved in the number record of the called party when the called party is called for the first time, and when it is determined according to the number version information that the input prompt of the called party is updated, displaying expiration prompt information to the user, or when it is determined according to the number version information that the input prompt of the called party is not updated, performing sending, according to a relationship between the root-level number information and sub-level i number information, the sub-level i number information corresponding to an $i^{th}$ input prompt of the called party.

With reference to any one of the second aspect, or the first to the fifth possible implementation manners of the second aspect, in a sixth possible implementation manner of the second aspect, the number record of the called party is saved using a call record and/or an address book.

A third aspect of this application provides an apparatus for storing a phone number, including an obtaining module and a saving module, where the obtaining module is configured to obtain a unified access number, and set the unified access number as root-level number information after a called party is successfully called for the first time according to the unified access number entered by a user, obtain information entered by the user according to an $n^{th}$ input prompt, and set the information entered by the user according to the $n^{th}$ input prompt as sub-level n number information when the $n^{th}$ input prompt sent by the called party is received, where $n \geq 1$, and send the root-level number information and the sub-level n number information to the saving module, and the saving module is configured to save the root-level number information, the sub-level n number information, and a relationship between the root-level number information and the sub-level number information as a number record of the called party such that when the called party is called for the second time, the corresponding sub-level number information in the number record is automatically sent to the called party according to an input prompt of the called party.

With reference to the third aspect, in a first possible implementation manner of the third aspect, that the obtaining module performs setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information.

With reference to the third aspect or the first possible implementation manner of the third aspect, in a second possible implementation manner of the third aspect, the obtaining module is further configured to obtain number version information sent by the called party, where the number version information is used to determine whether the input prompt of the called party is updated, and add the number version information to the number record of the called party.

With reference to any one of the third aspect, or the first to the second possible implementation manners of the third aspect, in a third possible implementation manner of the third aspect, the apparatus further includes a display module, where the obtaining module is further configured to obtain text information represented by the sub-level n number information, the saving module is further configured to add the text information represented by the sub-level n number information to the number record of the called party, and the display module is configured to display the sub-level n number information and/or the text information represented by the sub-level n number information.

With reference to any one of the first aspect, or the first to the third possible implementation manners of the first aspect, in a fourth possible implementation manner of the first aspect, the number record of the called party is saved using a call record and/or an address book.

A fourth aspect of this application provides an apparatus for dialing a phone number, including a first obtaining module, a call module, and a sending module, where the first obtaining module is configured to obtain, from a number record of a called party, root-level number information of the called party, number information of sub-levels 1 to j, and a relationship between the root-level number information and the number information of sub-levels 1 to j, where the root-level number information is a unified access number of the called party, the sub-level j number information is information entered by a user according to a $j^{th}$ input prompt of the called party when the called party is successfully called for the first time, and j is determined by a preset rule or user selection and is less than or equal to a total quantity of sub-levels in the number record. The call module is configured to call the called party for the second time according to the root-level number information, and the sending module is configured to send, according to a relationship between the root-level number information and sub-level i number information, the sub-level i number information corresponding to an $i^{th}$ input prompt of the called party after the second call succeeds, where i≥1 and i≤j.

With reference to the fourth aspect, in a first possible implementation manner of the fourth aspect, the apparatus further includes a second obtaining module and a saving module, where the second obtaining module is configured to obtain the unified access number, and set the unified access number as the root-level number information after the called party is successfully called for the first time according to the unified access number entered by the user, and obtain information entered by the user according to an $n^{th}$ input prompt, and set the information entered by the user according to the $n^{th}$ input prompt as sub-level n number information when the $n^{th}$ input prompt sent by the called party is received, where n≥1, and the saving module is configured to save the root-level number information, the sub-level n number information, and a relationship between the root-level number information and the sub-level number information as the number record of the called party.

With reference to the first possible implementation manner of the fourth aspect, in a second possible implementation manner of the fourth aspect, that the second obtaining module performs setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information, and that the sending module performs sending the sub-level i number information corresponding to an $i^{th}$ input prompt of the called party includes prompting the user to enter information, and sending the information entered by the user to the called party when the sub-level i number information corresponding to the $i^{th}$ input prompt of the called party is a preset privacy identifier, or sending the sub-level i number information to the called party when the sub-level i number information corresponding to the $i^{th}$ input prompt of the called party is not a preset privacy identifier.

With reference to either of the first to the second possible implementation manners of the fourth aspect, in a third possible implementation manner of the fourth aspect, the apparatus further includes a display module, where the second obtaining module is further configured to obtain text information represented by the sub-level n number information. The saving module is further configured to add the text information represented by the sub-level n number information to the number record of the called party, and the display module is configured to display the sub-level n number information and/or the text information represented by the sub-level n number information.

With reference to any one of the fourth aspect, or the first to the third possible implementation manners of the fourth aspect, in a fourth possible implementation manner of the fourth aspect, that the sending module performs the sending the sub-level i number information corresponding to an $i^{th}$ input prompt of the called party includes sending the sub-level i number information to the called party after a delay of an $i^{th}$ preset time, or sending the sub-level i number information to the called party when an input prompt sent by the called party is received for the $i^{th}$ time, or sending the sub-level i number information to the called party when an input prompt sent by the called party is identified for the $i^{th}$ time by means of speech recognition.

With reference to any one of the fourth aspect, or the first to the fourth possible implementation manners of the fourth aspect, in a fifth possible implementation manner of the fourth aspect, the apparatus further includes a version determining module, where the version determining module is configured to obtain number version information of the called party from the number record of the called party, where the number version information is saved in the number record of the called party when the called party is called for the first time, and display expiration prompt information to the user when it is determined according to the number version information that the input prompt of the called party is updated, or trigger the sending module to perform the sending, according to a relationship between the root-level number information and sub-level i number information, the sub-level i number information corresponding to an $i^{th}$ input prompt of the called party when it is determined according to the number version information that the input prompt of the called party is not updated.

With reference to any one of the fourth aspect, or the first to the fifth possible implementation manners of the fourth aspect, in a sixth possible implementation manner of the fourth aspect, the number record of the called party is saved using a call record and/or an address book.

A fifth aspect of this application provides a communications terminal, including a display, one or more processors, a memory, multiple application programs, and one or more programs, where the one or more programs are stored in the memory and are configured for execution by the one or more processors, the one or more programs include an instruction, and the instruction is used to enable the communications terminal to obtain a unified access number and set the unified access number as root-level number information after a called party is successfully called for the first time according to the unified access number entered by a user, obtain information entered by the user according to an $n^{th}$ input prompt, and set the information entered by the user according to the $n^{th}$ input prompt as sub-level n number information when the $n^{th}$ input prompt sent by the called party is received, where $n \geq 1$, and save the root-level number information, the sub-level n number information, and a relationship between the root-level number information and the sub-level number information as a number record of the called party such that when the called party is called for the second time, the corresponding sub-level number information in the number record is automatically sent to the called party according to an input prompt of the called party.

With reference to the fifth aspect, in a first possible implementation manner of the fifth aspect, setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information.

With reference to the fifth aspect or the first possible implementation manner of the fifth aspect, in a second possible implementation manner of the fifth aspect, the instruction is further used to enable the communications terminal to obtain number version information sent by the called party, where the number version information is used to determine whether the input prompt of the called party is updated, and add the number version information to the number record of the called party.

With reference to any one of the fifth aspect, or the first to the second possible implementation manners of the fifth aspect, in a third possible implementation manner of the fifth aspect, the instruction is further used to enable the communications terminal to obtain text information represented by the sub-level n number information, and saving the root-level number information, the sub-level n number information, and a relationship between the root-level number information and the sub-level number information as a number record of the called party includes saving the root-level number information, the sub-level n number information, the relationship between the root-level number information and the sub-level n number information, and the text information represented by the sub-level n number information as the number record of the called party, and displaying the sub-level n number information and/or the text information represented by the sub-level n number information.

With reference to any one of the fifth aspect, or the first to the third possible implementation manners of the fifth aspect, in a fourth possible implementation manner of the fifth aspect, the number record of the called party is saved using a call record and/or an address book.

A sixth aspect of this application provides a communications terminal, including a display, one or more processors, a memory, multiple application programs, and one or more programs, where the one or more programs are stored in the memory and are configured for execution by the one or more processors, the one or more programs include an instruction, and the instruction is used to enable the communications terminal to obtain, from a number record of the called party, root-level number information of the called party, number information of sub-levels 1 to j, and a relationship between the root-level number information and the number information of sub-levels 1 to j, where the root-level number information is a unified access number of the called party, the sub-level j number information is information entered by a user according to a $j^{th}$ input prompt of the called party when the called party is successfully called for the first time, and j is determined by a preset rule or user selection and is less than or equal to a total quantity of sub-levels in the number record, call the called party for the second time according to the root-level number information, and send, according to a relationship between the root-level number information and sub-level i number information, the sub-level i number information corresponding to an $i^{th}$ input prompt of the called party after the second call succeeds, where $i \geq 1$ and $i \leq j$.

With reference to the sixth aspect, in a first possible implementation manner of the sixth aspect, before obtaining, from a number record of a called party, root-level number information of the called party, number information of sub-levels 1 to j, and a relationship between the root-level number information and the number information of sub-levels 1 to j, the instruction is further used to enable the communications terminal to obtain the unified access number and set the unified access number as the root-level number information after the called party is successfully called for the first time according to the unified access number entered by the user, obtain information entered by the user according to an $n^{th}$ input prompt, and set the information entered by the user according to the $n^{th}$ input prompt as sub-level n number information when the $n^{th}$ input prompt sent by the called party is received, where $n \geq 1$, and save the root-level number information, the sub-level n number information, and a relationship between the root-level number information and the sub-level number information as the number record of the called party.

With reference to the first possible implementation manner of the sixth aspect, in a second possible implementation manner of the sixth aspect, setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information, and sending the sub-level i number information corresponding to an $i^{th}$ input prompt of the called party includes prompting the user to enter information, and sending the information entered by the user to the called party when the sub-level i number information corresponding to the $i^{th}$ input prompt of the called party is a preset privacy identifier, or sending the sub-level i number information to the called party when the sub-level i number information corresponding to the $i^{th}$ input prompt of the called party is not a preset privacy identifier.

With reference to either of the first to the second possible implementation manners of the sixth aspect, in a third possible implementation manner of the sixth aspect, the instruction is further used to enable the communications terminal to obtain text information represented by the sub-level n number information, and saving the root-level number information, the sub-level n number information, and a relationship between the root-level number information and the sub-level n number information as the number record of the called party includes saving the root-level number information, the sub-level n number information, the relationship between the root-level number information and the sub-level n number information, and the text information represented by the sub-level n number information as the number record of the called party, and displaying the sub-level n number information and/or the text information represented by the sub-level n number information.

With reference to any one of the sixth aspect, or the first to the third possible implementation manners of the sixth aspect, in a fourth possible implementation manner of the sixth aspect, sending the sub-level i number information corresponding to an $i^{th}$ input prompt of the called party includes sending the sub-level i number information to the called party after a delay of an $i^{th}$ preset time, sending the sub-level i number information to the called party when an input prompt sent by the called party is received for the $i^{th}$ time, or sending the sub-level i number information to the called party when an input prompt sent by the called party is identified for the $i^{th}$ time by means of speech recognition.

With reference to any one of the sixth aspect, or the first to the fourth possible implementation manners of the sixth aspect, in a fifth possible implementation manner of the sixth aspect, the instruction is further used to enable the communications terminal to obtain number version information of the called party from the number record of the called party, where the number version information is saved in the number record of the called party when the called party is called for the first time, and display expiration prompt information to the user when it is determined according to the number version information that the input prompt of the called party is updated, or perform sending, according to a relationship between the root-level number information and sub-level i number information, the sub-level i number information corresponding to an $i^{th}$ input prompt of the called party when it is determined according to the number version information that the input prompt of the called party is not updated.

With reference to any one of the sixth aspect, or the first to the fifth possible implementation manners of the sixth aspect, in a sixth possible implementation manner of the sixth aspect, the number record of the called party is saved using a call record and/or an address book.

A seventh aspect of this application provides a computer readable storage medium, where the computer readable storage medium is configured to store one or more programs, and the one or more programs include an instruction, and when being executed by a communications terminal that includes multiple application programs, the instruction is used to enable the communications terminal to perform the method according to the first aspect.

An eighth aspect of this application provides a computer readable storage medium, where the computer readable storage medium is configured to store one or more programs, and the one or more programs include an instruction, and the instruction is used to enable the communications terminal to perform the method according to the second aspect when being executed by a communications terminal that includes multiple application programs.

In the foregoing solution, a number record used in a process of calling a called party for a specific service is saved in advance. When the called party is called for the specific service for the second time, root-level number information that represents a unified access number of the called party and sub-level number information that represents information entered by a user according to an input prompt of the called party when the called party is called for the first time are obtained from the number record of the called party, and the called party is called according to the root-level number information. After the second call succeeds, the sub-level number information in the number record is automatically sent to the called party according to the input prompt of the called party. In this process, an automatic call to the service can be implemented, and the user does not need to manually enter information, thereby avoiding a complex input process and improving manipulation efficiency.

DESCRIPTION OF EMBODIMENTS

In the following description, to illustrate rather than limit, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted such that this application is described without being obscured by unnecessary details.

A communications terminal in this application may be any terminal that can implement a call, such as a desktop computer, a laptop computer, a tablet computer, or a handheld computer, or may be a cellular phone, a personal digital assistant (PDA), a special-purpose media player, or a consumer electronic device. Communication between the communications terminal and a called party may be wired communication, such as wired communication based on Ethernet or an optical fiber, or may be wireless communication, such as wireless communication based on WI-FI, BLUETOOTH, or a cellular network.

A unified access number in this application is a number for calling a main interface that may provide multiple services, for example, a mobile service desk manager number 10086, or a number of a telephone control board. A called party in this application is the main interface called according to the unified access number, for example, a service desk manager, or a telephone control board. After being successfully called according to the unified access number, the called party sends an input prompt to the communications terminal, and enters a specific service of the called party according to a selection sent by the communications terminal.

It should be noted that "first call" and "second call" described in the specification of this application is relative concepts. "First" and "second" merely indicate a sequence of two calls, that is, the first call indicates a call made by a user by manually entering information corresponding to an input prompt, and the second call may be any call after the first call.

Figure 1:
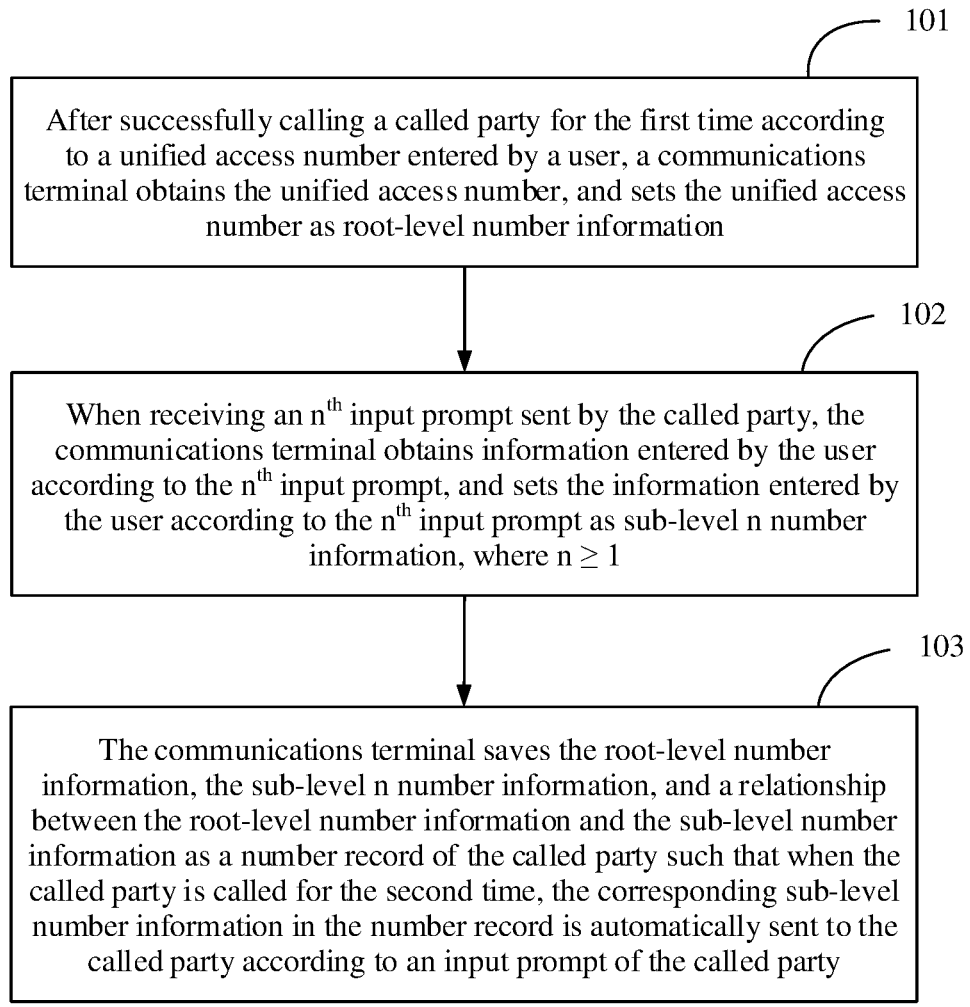
FIG. 1 is a flowchart of an implementation manner of a method for storing a phone number according to this application.

Referring to FIG. 1, FIG. 1 is a flowchart of an implementation manner of a method for storing a phone number according to this application. In this implementation manner, the method includes the following steps.

Step 101: After successfully calling a called party for the first time according to a unified access number entered by a user, a communications terminal obtains the unified access number, and sets the unified access number as root-level number information.

In this implementation manner, calling a mobile service desk manager is used as an example. The communications terminal sends a call instruction to the mobile service desk manager according to a unified access number 10086 of the mobile service desk manager. The mobile service desk manager that serves as the called party receives and responds to the call instruction. That is, a call is successfully implemented. After the call succeeds for the first time, the communications terminal obtains 10086, and sets 10086 as the root-level number information.

Step 102: When receiving an $n^{th}$ input prompt sent by the called party, the communications terminal obtains information entered by the user according to the $n^{th}$ input prompt, and sets the information entered by the user according to the $n^{th}$ input prompt as sub-level n number information, where $n \geq 1$.

After the call succeeds, the called party broadcasts, by means of voice, an input prompt instruction to the communications terminal. The communications terminal broadcasts, by means of voice, the input prompt according to the input prompt instruction, and after the user enters information, sends the entered information to the called party. The communications terminal sets the unified access number as the root-level number information, and sets the information entered by the user according to the $n^{th}$ input prompt as corresponding sub-level n number information.

Calling a mobile service desk manager is still used as an example. After the call succeeds, the mobile service desk manager sends input prompt information to the user for the first time in order to prompt the user to select a language. The user first selects a Mandarin service by entering "1" according to the first input prompt. The communications terminal sends "1" entered by the user to the mobile service desk manager. After receiving "1", the mobile service desk manager determines that the language selected by the user is Mandarin, and continues to send input prompt information for the second time to the communications terminal in Mandarin in order to prompt the user to select a required service. The user second selects a manual service by entering "9" according to the second input prompt. The communications terminal sends "9" entered by the user to the mobile service desk manager, and after receiving "9", the mobile service desk manager forwards the call to the manual service. After manual consultation is completed, the user hangs up, that is, interrupts this call. The communications terminal obtains "1" entered by the user and uses "1" as sub-level 1 number information, and obtains "9" entered by the user and uses "9" as sub-level 2 number information.

Step 103: The communications terminal saves the root-level number information, the sub-level n number information, and a relationship between the root-level number information and the sub-level number information as a number record of the called party such that when the called party is called for the second time, the corresponding sub-level number information in the number record is automatically sent to the called party according to an input prompt of the called party.

Figure 2:
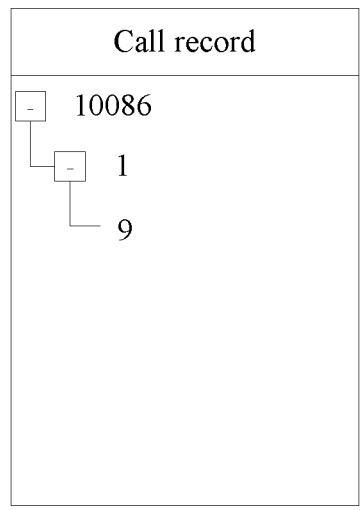
FIG. 2 is a first schematic diagram of displaying a number record hierarchically using a tree model in an implementation manner of a method for storing a phone number according to this application.
Figure 3:
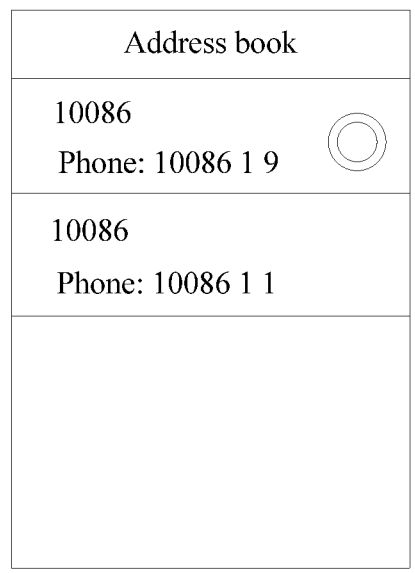
FIG. 3 is a second schematic diagram of displaying a number record hierarchically using a juxtaposed model in an implementation manner of a method for storing a phone number according to this application.

Calling a mobile service desk manager is still used as an example. The communications terminal obtains the root-level number information "10086", obtains the sub-level 1 number information "1", and obtains the sub-level 2 number information "9", and a relationship between the root-level number information and sub-level number information is "1" is sub-level 1 of "10086", and "9" is sub-level 2 of "10086". The foregoing information is used as the number record of the mobile service desk manager in order to generate a corresponding record file. The number record may be saved and displayed using a call record and/or an address book. Generally, the root-level number information and number information of each sub-level in the number record are hierarchically displayed using a tree model (as shown in FIG. 2) or a juxtaposed model (as shown in FIG. 3). For example, the communications terminal saves and displays the foregoing number record of the mobile service desk manager in a call record using a tree model (as shown in FIG. 2). The user may choose to save number information of any sub-level in the number record in an address book such that a process of manually editing the address book is not required. If the user taps a sub-level 2 node "9" and chooses to save the sub-level 2 node "9" in the address book, the communications terminal obtains an instruction that is used for choosing to save the sub-level 2 node "9" in the address book and that is entered by the user, sets the root-level number information "10086", the sub-level 1 number information "1" and the sub-level 2 number information "9", and the relationship between the root-level number information and the sub-level number information as a number record of the mobile service desk manager, and saves and displays the number record in the address book using a juxtaposed model (number information of each level is separated using a separator such as a space in order to identify number information of each level) (as shown in FIG. 3).

After successfully saving the number record, the user may automatically call the mobile service desk manager, for the second time by directly using the saved number record, for a sub-service. For example, after receiving a second call instruction of the user for the manual service on the mobile service desk manager, the communications terminal sends the call instruction to the mobile service desk manager according to the root-level number information "10086" in the saved number record corresponding to the manual service of the mobile service desk manager. After a call succeeds, the communications terminal automatically sends the sub-level 1 number information "1" in the number record when receiving a first input prompt sent by the service desk manager, and automatically sends the sub-level 2 number information "9" in the number record when receiving a second input prompt sent by the mobile service desk manager such that information corresponding to an input prompt of the service desk manager can be automatically sent according to an input record of the user, and manual input is not required.

Figure 4:
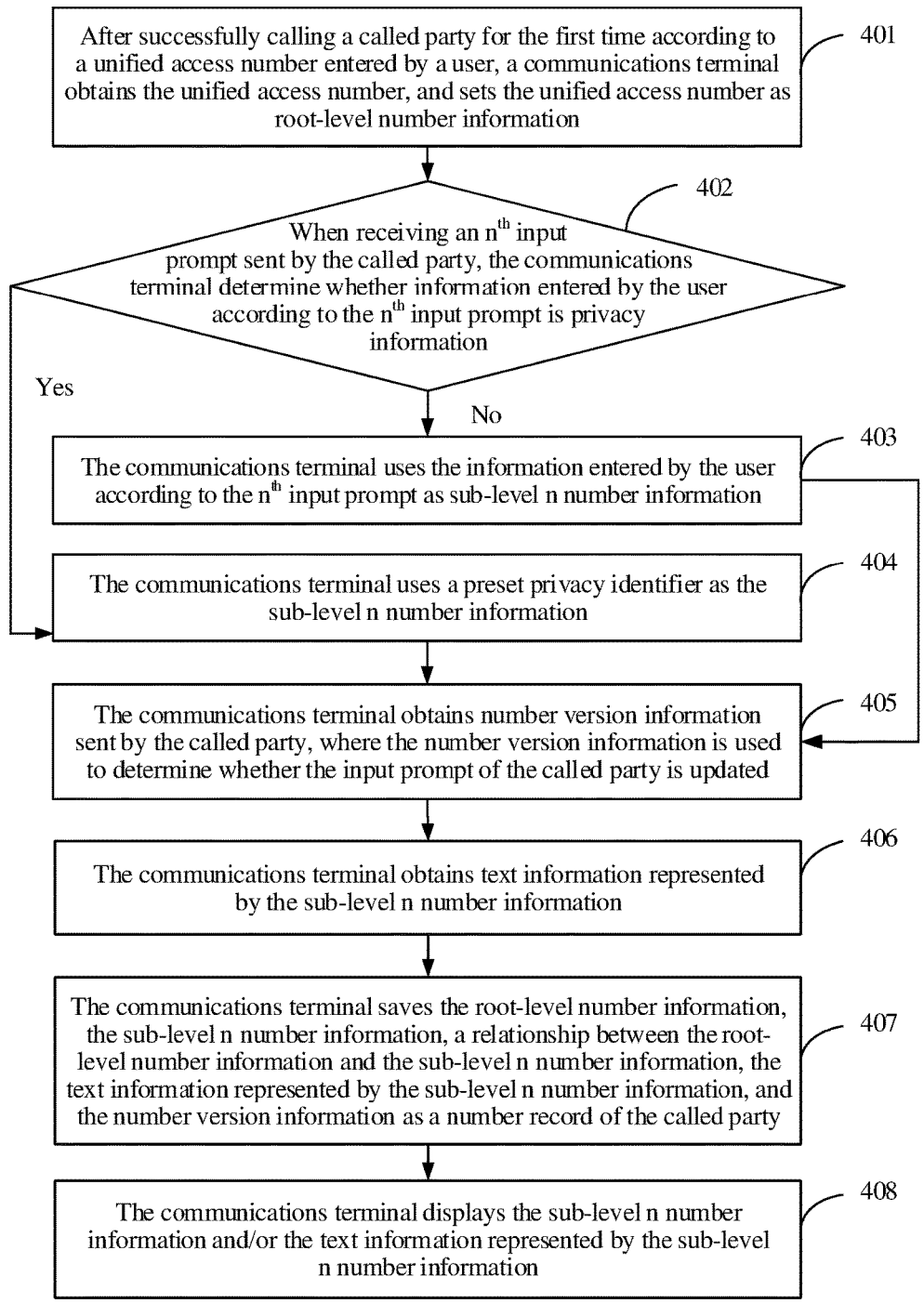
FIG. 4 is a flowchart of another implementation manner of a method for storing a phone number according to this application.

Referring to FIG. 4, FIG. 4 is a flowchart of another implementation manner of a method for storing a phone number according to this application. The method includes the following steps.

Step 401: After successfully calling a called party for the first time according to a unified access number entered by a user, a communications terminal obtains the unified access number, and sets the unified access number as root-level number information.

In this implementation manner, calling a mobile service desk manager is used as an example. After successfully calling the mobile service desk manager for the first time according to a unified access number of the mobile service desk manager, the communications terminal obtains the unified access number 10086 as the root-level number information.

Step 402: When receiving an $n^{th}$ input prompt sent by the called party, the communications terminal determines whether information entered by the user according to the $n^{th}$ input prompt is privacy information. If the information is not privacy information, perform step 403, or if the information is privacy information, perform step 404.

After obtaining an input prompt sent by the called party, the communications terminal first determines, according to the input prompt, whether corresponding information entered by the user is privacy information. For example, a speech recognition module is disposed on the communications terminal. When broadcasting, by means of voice, the input prompt of the called party, the communications terminal identifies, by means of speech recognition, whether the input prompt includes a privacy-related word, such as "bank card number", "password", or "ID card number", and if the input prompt includes a privacy-related word, the communications terminal determines that the corresponding information entered by the user is privacy information. Alternatively, an input prompt instruction that is sent by the called party and that is related to privacy has an identifier different from that of a common instruction, and when determining that an input prompt instruction sent by the called party is not a common instruction, the communications terminal determines that the corresponding information entered by the user is privacy information.

Step 403: The communications terminal uses the information entered by the user according to the $n^{th}$ input prompt as sub-level n number information.

Step 404: The communications terminal uses a preset privacy identifier as the sub-level n number information.

Further, calling a mobile service desk manager is still used as an example. After being successfully called for the first time, the mobile service desk manager sends a first input prompt to the communications terminal such that the user can select a language. The communications terminal determines that the first input prompt does not include a privacy-related word, and directly obtains "1" that is entered by the user corresponding to the first input prompt, and sets "1" as sub-level 1 number information. The mobile service desk manager receives the entered information "1" sent by the communications terminal, and determines that the language selected by the user is Mandarin, and sends a second input prompt to the communications terminal such that the user can select a type of service. The communications terminal determines that the second input prompt does not include a privacy-related word, and directly obtains "3" that is entered by the user corresponding to the second input prompt and sets "3" as sub-level 2 number information. The mobile service desk manager receives the entered information "3" sent by the communications terminal, and determines that a service selected by the user is call cost recharging. The mobile service desk manager sends a third input prompt to the communications terminal such that the user can enter a bank card number and a password. The communications terminal determines that the third input prompt includes a privacy-related word "bank card number", and directly sets a preset privacy identifier such as "***" as sub-level 3 number information. After the mobile service desk manager receives information that is entered by the user corresponding to the third input prompt and that is sent by the communications terminal, the call cost recharging is completed.

Generally, the preset privacy identifier should be set to a character or a character string that can be distinguished from information entered by the user according to an input prompt.

Step 405: The communications terminal obtains number version information sent by the called party, where the number version information is used to determine whether the input prompt of the called party is updated.

As a preferable implementation manner, in this implementation manner, the communications terminal may further record the number version information sent by the called party such that when performing a subsequent call according to a number record, the communications terminal can determine whether the number record is valid. The number version information corresponds to each update of a user operation process of the called party. When calling the called party next time according to the saved number record, the user may compare the saved number version information with current number version information of the called party to determine whether the saved number version information is consistent with the current number version information. If the saved number version information is consistent with the current number version information, it is determined that the number record is valid, and a call to a sub-level number is automatically implemented according to the number record, or if the saved number version information is inconsistent with the current number version information, it is determined that the number record is invalid, and the user is notified that the number record has expired.

Generally, during a call process, the called party releases the current number version information to the communications terminal. The communications terminal obtains the current number version information released by the called party, for example, "version 2.1".

Step 406: The communications terminal obtains text information represented by the sub-level n number information.

As a preferable implementation manner, in this implementation manner, when the user enters the information corresponding to the $n^{th}$ input prompt, the communications terminal may further obtain, by means of parsing and according to an $n^{th}$ input prompt instruction sent by the called party, text information represented by the $n^{th}$ input prompt, or when broadcasting, by means of voice, the $n^{th}$ input prompt sent by the called party, the communications terminal obtains, by means of speech recognition, the text information represented by the $n^{th}$ input prompt such that the user can more intuitively learn a sub-service represented by number information of each sub-level. Then, the communications terminal selects, according to the information that is entered by the user corresponding to the $n^{th}$ input prompt, that is, the sub-level n number information, a corresponding part of the text information represented by the $n^{th}$ input prompt as the text information represented by the sub-level n number information. For example, the communications terminal obtains text information by parsing a first input prompt instruction sent by the mobile service desk manager, which is "Mandarin service—1, English service—2", and obtains, according to "1" that is entered by the user and that corresponds to a first input prompt, text information represented by the information "1", that is, "Mandarin service". The communications terminal obtains, by parsing a third input prompt instruction sent by the mobile service desk manager, text information, that is, "enter a bank card number and a password", and obtains, according to information that is entered corresponding to a third input prompt, text information represented by the information, that is, "enter a bank card number and a password".

Step 407: The communications terminal saves the root-level number information, the sub-level n number information, a relationship between the root-level number information and the sub-level n number information, the text information represented by the sub-level n number information, and the number version information as a number record of the called party.

Further, calling a mobile service desk manager is still used as an example. The communications terminal saves the following as the number record of the mobile service desk manager: the obtained root-level number information "10086", the sub-level 1 number information "1", the sub-level 2 number information "3", the sub-level 3 number information "*", a relationship between the root-level number information and sub-level number information: "1" is sub-level 1 of "10086", "3" is sub-level 2 of "10086", and "*" is sub-level 3 of "10086", the number version information of the mobile service desk manager "version 2.1", the first text information "Mandarin service", the second text information "call cost recharging", and the third text information "please enter a bank card number and a password". The number record may be saved in a call record and/or an address book.

Step 408: The communications terminal displays the sub-level n number information and/or the text information represented by the sub-level n number information.

Figure 5:
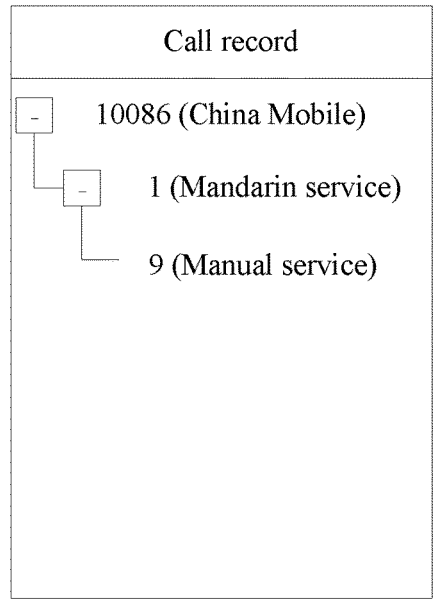
FIG. 5 is a third schematic diagram of displaying a number record hierarchically and displaying text information represented by number information of each sub-level in another implementation manner of a method for storing a phone number according to this application.

For example, the communications terminal hierarchically displays, using a tree model, the root-level number information and number information of each sub-level in the number record of the foregoing mobile service desk manager in the call record, and displays, in a juxtaposed manner, number information of each sub-level and text information represented by number information of each sub-level, as shown in FIG. 5. The user may call the called party by selecting the displayed root-level number information or the displayed number information of any sub-level. The communications terminal calls the called party according to user selection, and automatically performs a process of inputting corresponding sub-level number information.

It may be understood that this implementation manner is a preferable manner. In another implementation manner, the foregoing steps 402 to 404, step 405, or step 406 may be selectively performed, according to a function that needs to be achieved, based on steps shown in FIG. 1. Correspondingly, when step 405 is not performed, the number record saved in step 407 does not include the number version information, or when step 406 is not performed, the number record saved in step 407 does not include the text information represented by the sub-level n number information, and correspondingly, the communications terminal performs the displaying the sub-level n number information in step 408.

In addition, a sequence of the steps in the method for storing a phone number in this application should impose no limitation on the method in this application. The foregoing sequence of the steps is merely used for clearly describing this method. In different implementation manners, after a call succeeds, the foregoing steps for obtaining root-level number information, sub-level number information, number version information, and text information represented by the sub-level number information may be performed in any sequence, or may be performed simultaneously.

Figure 6:
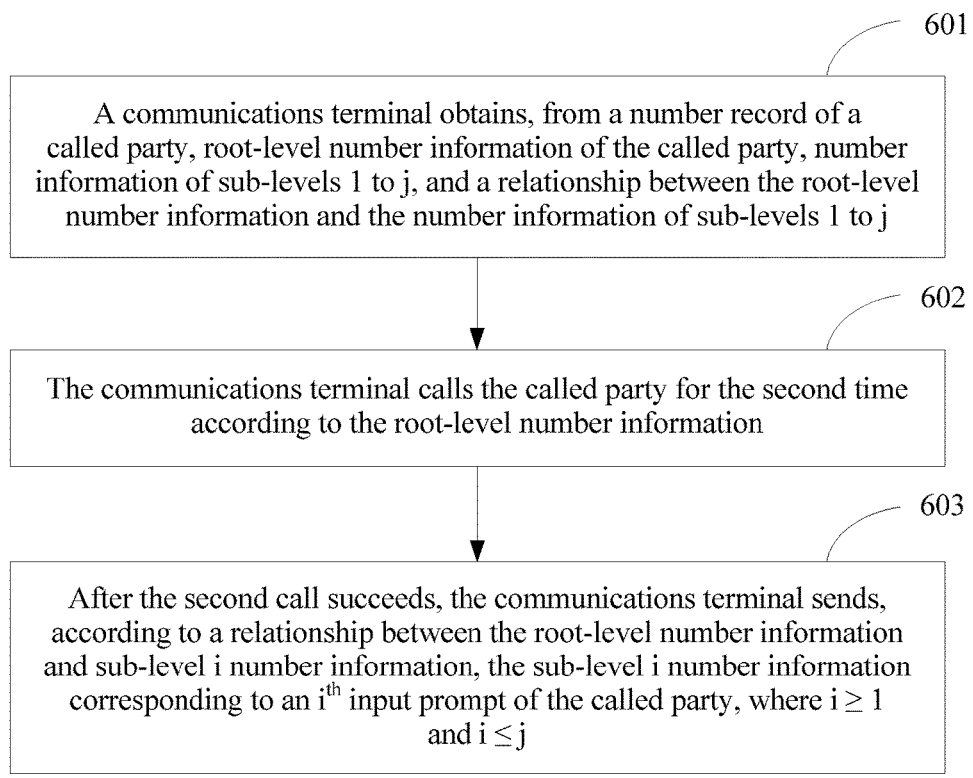
FIG. 6 is a flowchart of an implementation manner of a method for dialing a phone number according to this application.

Referring to FIG. 6, FIG. 6 is a flowchart of an implementation manner of a method for dialing a phone number according to this application. A communications terminal saves a number record of a called party in advance, and performs the method for dialing a phone number. The communications terminal may perform the foregoing implementation manner of storing a phone number such that the number record of the called party can be saved in advance. Further, this method includes the following steps.

Step 601: The communications terminal obtains, from a number record of the called party, root-level number information of the called party, number information of sub-levels 1 to j, and a relationship between the root-level number information and the number information of sub-levels 1 to j, where the root-level number information is a unified access number of the called party, the sub-level j number information is information entered by a user according to a j input prompt of the called party when the called party is successfully called for the first time, and j is determined by a preset rule or user selection and is less than or equal to a total quantity of sub-levels in the number record.

For example, when calling the called party, such as a mobile service desk manager, for the first time, the communications terminal performs the foregoing implementation manner of storing a phone number in order to save the number record of the called party in an address book. The user calls the mobile service desk manager for a manual service by selecting a display item "9" from the number record in the address book shown in FIG. 2. Because "9" is sub-level 2 number information in the number record of the mobile service desk manager, j is determined as 2. The user obtains, from the number record that is in the address book and that is of the mobile service desk manager, root-level number information "10086", number information of sub-levels 1 and 2: sub-level 1 number information "1" and sub-level 2 number information "9", and a relationship between the root-level number information and the number information of sub-levels 1 and 2, which includes "1" is sub-level 1 of "10086", and "9" is sub-level 2 of "10086".

Likewise, the user may also choose to call, from a call record, the called party for a corresponding service.

It may be understood that, in the foregoing example, j is determined by user selection. However, in another implementation manner, the j may be directly a total quantity of sub-levels in the number record of the called party. As shown in FIG. 2, a total quantity of sub-levels in the number record is also 2. Alternatively, when receiving a call instruction that is used for calling the called party and that is entered by the user, the communications terminal determines j according to the preset rule. For example, a quantity of corresponding sub-levels is determined as j according to call frequency of another terminal on the highest sub-level of the called party, or a quantity of sub-levels is determined as j according to a specific call or multiple calls performed by the user.

Step 602: The communications terminal calls the called party for the second time according to the root-level number information.

For example, the communications terminal calls the mobile service desk manager for the second time according to the foregoing obtained root-level number information "10086".

Step 603: After the second call succeeds, the communications terminal sends, according to a relationship between the root-level number information and sub-level i number information, the sub-level i number information corresponding to an $i^{th}$ input prompt of the called party, where i≥1 and i≤j.

For example, when the second call to the mobile service desk manager succeeds, the communications terminal automatically sends, to the mobile service desk manager, the number information of sub-levels 1 to j that is obtained from the number record of the mobile service desk manager corresponding to a first to a $j^{th}$ input prompts of the mobile service desk manager.

The sending the sub-level i number information corresponding to an $i^{th}$ input prompt of the called party may include sending the sub-level i number information to the called party after a delay of an $i^{th}$ preset time, where the preset time may be preset by the user or a mobile terminal, or may continue to be preset according to duration of an $i^{th}$ input prompt sent by the called party last time, a value of the preset time is generally zero to five seconds, preferably, the preset time is two to three seconds, and more preferably, the preset time is two seconds, it may be understood that to-be-delayed preset times corresponding to all input prompts may be set to be the same or be different, and this is not limited herein, for example, after successfully calling the mobile service desk manager according to "10086", the communications terminal sends the sub-level 1 number information "1" to the mobile service desk manager after a delay of a first preset time, and sends the sub-level 2 number information "9" to the mobile service desk manager after a delay of a second preset time, that is, a call to the mobile service desk manager for the manual service is automatically implemented, or sending the sub-level i number information to the called party when an input prompt sent by the called party is received for the $i^{th}$ time, where for example, when receiving, for the $i^{th}$ time, an input prompt instruction sent by the called party, the communications terminal sends the sub-level i number information in the number record to the called party, or sending the sub-level i number information to the called party when an input prompt sent by the called party is identified for the $i^{th}$ time by means of speech recognition, where, for example, the communications terminal identifies, by means of speech recognition, whether a voice announcement sent by the called party includes "please enter", if it is identified, for an $i^{th}$ time, that the voice announcement sent by the called party includes "please enter", the communications terminal determines that the voice announcement is the input prompt that is of the called party and that is received for the $i^{th}$ time, and sends the sub-level i number information in the number record to the called party.

Figure 7:
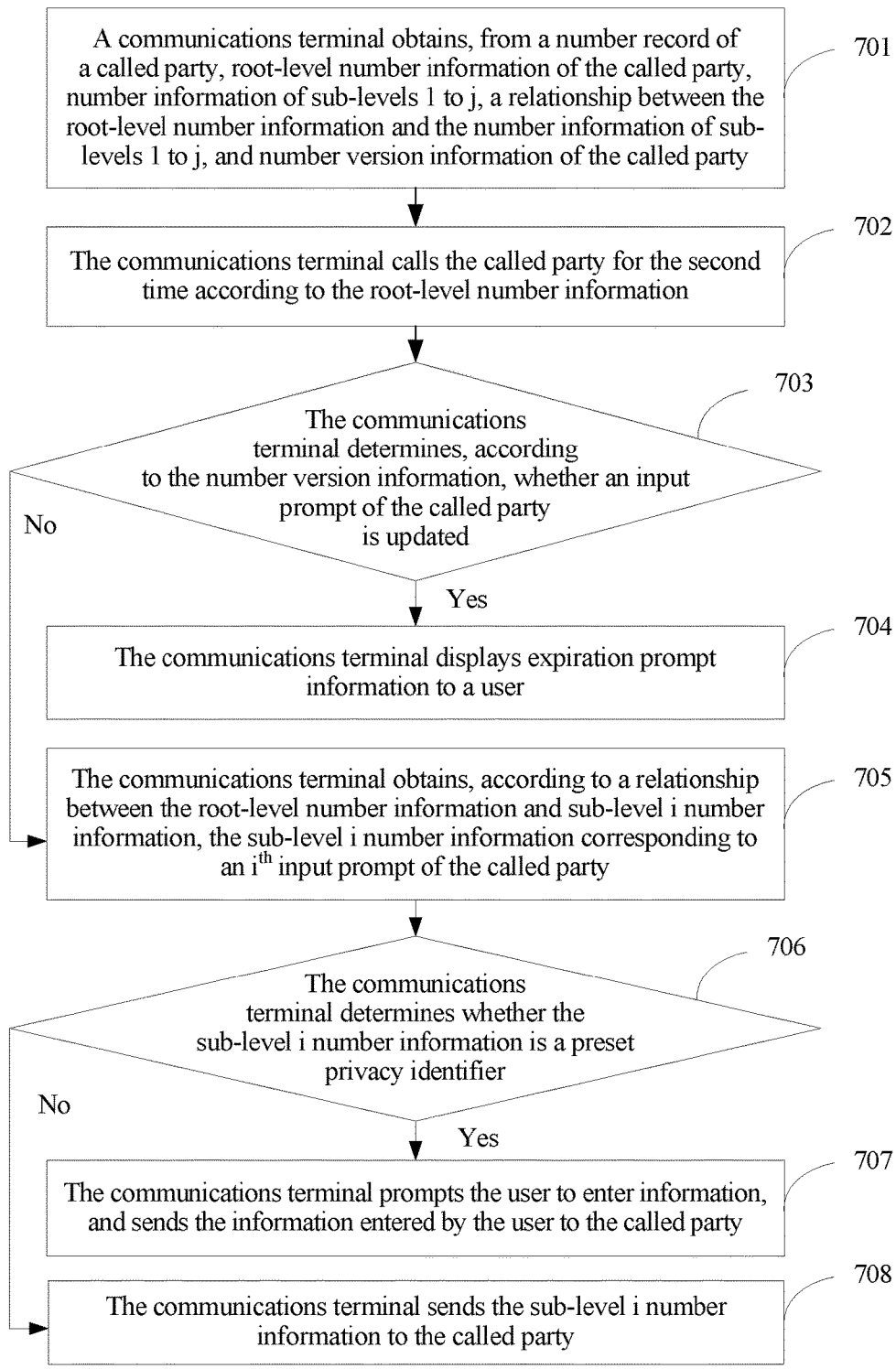
FIG. 7 is a flowchart of another implementation manner of a method for dialing a phone number according to this application.

Referring to FIG. 7, FIG. 7 is a flowchart of another implementation manner of a method for dialing a phone number according to this application. A communications terminal saves a number record of a called party in advance, and performs the method for dialing a phone number, where the communications terminal may perform the foregoing implementation manner of storing a phone number such that the number record of the called party can be saved in advance. Further, this method includes the following steps.

Step 701: The communications terminal obtains, from a number record of the called party, root-level number information of the called party, number information of sub-levels 1 to j, a relationship between the root-level number information and the number information of sub-levels 1 to j, and number version information of the called party, where the root-level number information is a unified access number of the called party, the sub-level j number information is information entered by a user according to a $j^{th}$ input prompt of the called party when the called party is successfully called for the first time, and j is determined by a preset rule or user selection and is less than or equal to a total quantity of sub-levels in the number record.

For example, when calling the called party, such as a mobile service desk manager, for the first time, the communications terminal performs the foregoing implementation manner of storing a phone number in order to save the number record of the called party in an address book. The user selects a display item "please enter a bank card number and a password" from the number record in the address book shown in FIG. 5 to call the mobile service desk manager for call cost recharging. Because "please enter a bank card number and a password" is sub-level 3 number information in the number record of the mobile service desk manager, j is determined as 3. The user obtains, from the number record that is in the address book and that is of the mobile service desk manager, root-level number information "10086" of the mobile service desk manager, number information of sub-levels 1 to 3: sub-level 1 number information "1", sub-level 2 number information "3", and sub-level 3 number information "*", a relationship between the root-level number information and sub-level number information, which includes: "1" is sub-level 1 of "10086", "3" is sub-level 2 of "10086", "*" is sub-level 3 of "10086", and number version information "version 2.1". The number version information is saved in the number record of the called party when the called party is called for the first time, and corresponds to each update of a user operation process of the called party.

Step 702: The communications terminal calls the called party for the second time according to the root-level number information.

For example, the communications terminal sends a call instruction to the mobile service desk manager according to the foregoing obtained root-level number information "10086".

Step 703: The communications terminal determines, according to the number version information, whether the input prompt of the called party is updated.

For example, the communications terminal sends the number version information in the number record to the called party. Generally, when calling the called party according to the root-level number information, the communications terminal may add the number version information to the call instruction. The called party compares the received number version information with current number version information of the called party, and sends a comparison result to the communications terminal. Certainly, the communications terminal may perform the comparison itself. For example, the called party regularly communicates with the communications terminal. When the number version information of the called party is updated, the called party sends updated number version information to the communications terminal, and the communications terminal locally saves the latest number version information sent by the called party. The communications terminal automatically compares the number version information in the number record with the latest saved number version information when the user needs to call the called party. If the comparison result is that the number version information in the number record is inconsistent with the latest saved number version information, the communications terminal performs step 704, or if the comparison result is that the number version information in the number record is consistent with the latest saved number version information, the communications terminal performs step 705.

Step 704: The communications terminal displays expiration prompt information to the user.

If the number version information in the number record is inconsistent with the current number version information of the called party, it is determined that the input prompt of the called party is updated, and automatically entered information that is saved in the number record may not be corresponding to a current input prompt. To avoid an improper automatic operation, the communications terminal no longer performs sending sub-level number information in the number record, but displays the expiration prompt information to the user in order to prompt the user that the saved number record is invalid, and manual input is required.

Step 705: The communications terminal obtains, according to a relationship between the root-level number information and sub-level i number information, the sub-level i number information corresponding to an $i^{th}$ input prompt of the called party.

If the number version information in the number record is consistent with the current number version information of the called party, it is determined that the input prompt of the called party is not updated. The communications terminal may obtain the sub-level i number information according to the relationship between the root-level number information and the sub-level i number information after a delay of an $i^{th}$ preset time, when the input prompt sent by the called party is received for the $i^{th}$ time, or when the input prompt sent by the called party is identified for the $i^{th}$ time by means of speech recognition.

Step 706: The communications terminal determines whether the sub-level i number information is a preset privacy identifier. If the sub-level i number information is the preset privacy identifier, perform step 707, or if the sub-level i number information is not the preset privacy identifier, perform step 708.

Step 707: The communications terminal prompts the user to enter information, and sends the information entered by the user to the called party.

Step 708: The communications terminal sends the sub-level i number information to the called party.

For example, when receiving, for the first time, an input prompt sent by the mobile service desk manager, the communications terminal obtains the sub-level 1 number information "1", and determines that the sub-level 1 number information "1" is not a preset privacy identifier. Therefore, the sub-level 1 number information "1" is not privacy information, and the communications terminal sends the sub-level 1 number information "1" to the mobile service desk manager. When receiving, for the second time, an input prompt sent by the mobile service desk manager, the communications terminal obtains the sub-level 2 number information "3", and determines that the sub-level 2 number information "3" is not a preset privacy identifier. Therefore, the sub-level 2 number information "3" is not privacy information, and the communications terminal sends the sub-level 2 number information "3" to the mobile service desk manager. When receiving, for the third time, an input prompt sent by the mobile service desk manager, the communications terminal obtains the sub-level 3 number information "*" and determines that the sub-level 3 number information "*" is a preset privacy identifier. Therefore, the sub-level 3 number information "***" is privacy information, and the communications terminal prompts, according to the input prompt sent by the mobile service desk manager for the third time or text information that is saved by the mobile service desk manager and that is represented by the sub-level 3 number information, the user to enter "a bank card number and a password", and sends the information entered by the user to the mobile service desk manager.

Figure 8:
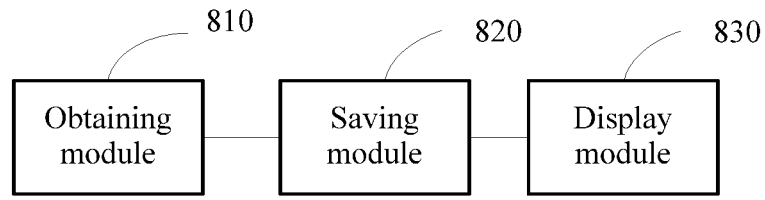
FIG. 8 is a schematic structural diagram of an implementation manner of an apparatus for storing a phone number according to this application.

Referring to FIG. 8, FIG. 8 is a schematic structural diagram of an implementation manner of an apparatus for storing a phone number according to this application. The apparatus includes an obtaining module 810 and a saving module 820.

The obtaining module 810 is configured to obtain a unified access number, and set the unified access number as root-level number information after a called party is successfully called for the first time according to the unified access number entered by a user, obtain information entered by the user according to an $n^{th}$ input prompt, and set the information entered by the user according to the $n^{th}$ input prompt as sub-level n number information when the $n^{th}$ input prompt sent by the called party is received, where $n \geq 1$, and send the root-level number information and the sub-level n number information to the saving module 820.

The saving module 820 is configured to save the root-level number information, the sub-level n number information, and a relationship between the root-level number information and the sub-level number information as a number record of the called party such that when the called party is called for the second time, the corresponding sub-level number information in the number record is automatically sent to the called party according to an input prompt of the called party.

The number record may be saved and displayed using a call record and/or an address book. For the display of the number record, the root-level number information and number information of each sub-level in the number record are hierarchically displayed using a tree model (as shown in FIG. 2) or a juxtaposed model (as shown in FIG. 3).

Preferably, that the obtaining module 810 performs setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information.

Further, a speech recognition module (not shown) is disposed on the obtaining module 810. When a communications terminal broadcasts, by means of voice, the input prompt of the called party, the obtaining module 810 identifies, by means of speech recognition, whether the input prompt includes a privacy-related word, such as "bank card number", "password", or "ID card number", and if the input prompt includes a privacy-related word, the communications terminal determines that corresponding information entered by the user is privacy information. Alternatively, a privacy-related input prompt instruction sent by the called party has an identifier different from that of a common instruction, and when the obtaining module 810 determines that an input prompt instruction sent by the called party is not a common instruction, the communications terminal determines that the corresponding information entered by the user is privacy information.

Generally, the preset privacy identifier may be set to a character or a character string that can be distinguished from information entered by the user according to an input prompt.

Preferably, the obtaining module 810 is further configured to obtain number version information sent by the called party, and send the number version information to the saving module 820 such that when performing a subsequent call according to a number record, the communications terminal can determine whether the number record is valid. The number version information is used to determine whether the input prompt of the called party is updated. The number version information corresponds to each update of a user operation process of the called party.

The saving module 820 is further configured to add the number version information to the number record of the called party.

The apparatus for storing a phone number may further include a display module 830.

The display module 830 is configured to hierarchically display the root-level number information and the sub-level n number information in the number record according to the relationship between the root-level number information and the sub-level n number information in the number record.

The obtaining module 810 is further configured to obtain text information represented by the sub-level n number information, and send the text information represented by the sub-level n number information to the saving module 820 such that the user can more intuitively learn a sub-service represented by number information of each sub-level.

The saving module 820 is further configured to add the text information represented by the sub-level n number information to the number record of the called party.

The display module 830 is further configured to display the sub-level n number information and/or the text information represented by the sub-level n number information.

Figure 9:
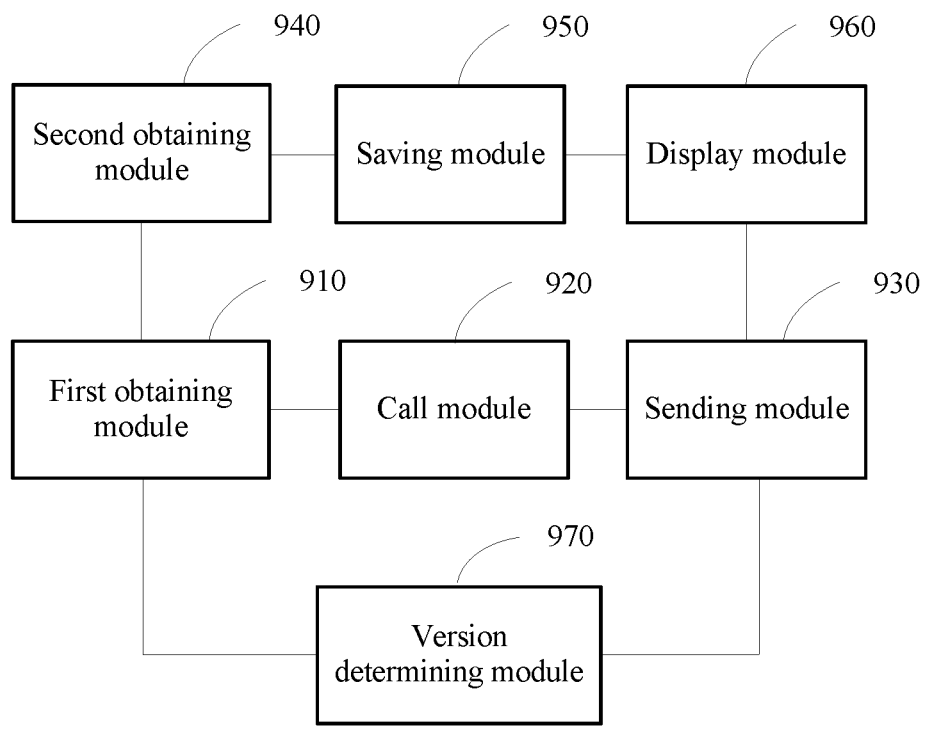
FIG. 9 is a schematic structural diagram of an implementation manner of an apparatus for dialing a phone number according to this application.

Referring to FIG. 9, FIG. 9 is a schematic structural diagram of an implementation manner of an apparatus for dialing a phone number according to this application. In this implementation manner, the apparatus saves a number record of a called party in advance. The apparatus includes a first obtaining module 910, a call module 920, and a sending module 930.

The first obtaining module 910 is configured to obtain, from the number record of the called party, root-level number information of the called party, number information of sub-levels 1 to j, and a relationship between the root-level number information and the number information of sub-levels 1 to j, where the root-level number information is a unified access number of the called party, the sub-level j number information is information entered by a user according to a j input prompt of the called party when the called party is successfully called for the first time, and j is determined by a preset rule or user selection and is less than or equal to a total quantity of sub-levels in the number record.

When calling the called party for the first time, the apparatus for dialing a phone number saves the number record of the called party in advance in a call record and/or an address book. The first obtaining module 910 obtains the number record of the called party from the call record or the address book.

The call module 920 is configured to call the called party for the second time according to the root-level number information.

The sending module 930 is configured to send, according to a relationship between the root-level number information and sub-level i number information, the sub-level i number information corresponding to an $i^{th}$ input prompt of the called party after the second call succeeds, where $i \geq 1$ and $i \leq j$.

Further, the sending module 930 may send the sub-level i number information in the number record to the called party according to the relationship between the root-level number information and the sub-level i number information after a delay of an $i^{th}$ preset time, when the input prompt sent by the called party is received for the $i^{th}$ time, or when the input prompt sent by the called party is identified for the $i^{th}$ time by means of speech recognition.

The apparatus for dialing a phone number may further include a second obtaining module 940 and a saving module 950. The second obtaining module 940 and the saving module 950 are respectively consistent with the obtaining module 810 and the saving module 820 in the foregoing implementation manner of storing a phone number, and details are not described herein.

Preferably, that the sending module 930 performs sending the sub-level i number information corresponding to an $i^{th}$ input prompt of the called party includes prompting the user to enter information, and sending the information entered by the user to the called party when the sub-level i number information corresponding to the $i^{th}$ input prompt of the called party is a preset privacy identifier, or sending the sub-level i number information to the called party when the sub-level i number information corresponding to the $i^{th}$ input prompt of the called party is not a preset privacy identifier.

Further, that the sending module 930 performs sending the sub-level i number information corresponding to an $i^{th}$ input prompt of the called party includes obtaining the sub-level i number information of the called party after a delay of an $i^{th}$ preset time, when the input prompt sent by the called party is received for the $i^{th}$ time, or when the input prompt sent by the called party is identified for the $i^{th}$ time by means of speech recognition, and prompting the user to enter information, and sending the information entered by the user to the called party when the sub-level i number information is a preset privacy identifier, or sending the sub-level i number information to the called party when the sub-level i number information is not a preset privacy identifier.

The apparatus for dialing a phone number may further include a display module 960. The display module 960 is consistent with the display module 830 in the foregoing implementation manner of storing a phone number, and details are not described herein.

The number record includes number version information, and the apparatus for dialing a phone number may further include a version determining module 970. The version determining module 970 is configured to obtain the number version information of the called party from the number record of the called party, where the number version information is saved in the number record of the called party when the called party is called for the first time, and display expiration prompt information to the user when it is determined according to the number version information that the input prompt of the called party is updated, or trigger the sending module 930 to perform sending, according to a relationship between the root-level number information and sub-level i number information, the sub-level i number information corresponding to an $i^{th}$ input prompt of the called party when it is determined according to the number version information that the input prompt of the called party is not updated.

The foregoing apparatus for storing a phone number and the foregoing apparatus for dialing a phone number may be communications terminals, or may be some hardware circuits that are of a communications terminal and that can execute a software program.

Figure 10:
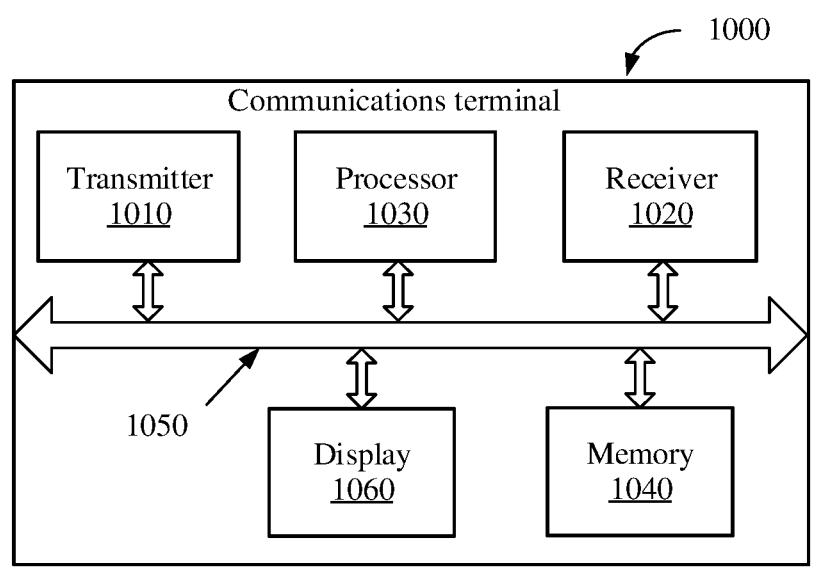
FIG. 10 is a schematic structural diagram of an implementation manner of a communications terminal according to this application.

Referring to FIG. 10, FIG. 10 is a schematic structural diagram of an implementation manner of a communications terminal 1000 according to this application. The communications terminal 1000 in this implementation manner includes a transmitter 1010, a receiver 1020, one or more processors 1030, a memory 1040, a display 1060, and a bus 1050.

The transmitter 1010 is configured to send an instruction and information to a called party, which, for example, may be calling the called party, or sending input information to the called party.

The receiver 1020 is configured to receive the instruction and the information sent by the called party, for example, receive an input prompt of the called party.

The display 1060 is configured to display information entered by a processor 1030.

The memory 1040 may include a read-only memory (ROM) and a random access memory (RAM). A part of the memory 1040 may further include a non-volatile RAM (NVRAM).

The memory 1040 stores the elements, such as an executable module or a data structure, a subset of an executable module or a data structure, or an extended set of an executable module or a data structure, such as an operation instruction including various operation instructions, which are used to implement various operations, or an operating system, including various system programs, which are used to implement various basic services and process hardware-based tasks.

The processor 1030 may also be referred to as a central processing unit (CPU). In a specific application, all components of the communications terminal 1000 are coupled together using the bus 1050. In addition to a data bus, the bus 1050 may include a power supply bus, a control bus, a state signal bus, and the like. However, for clarity of description, various buses are marked as the bus 1050 in the figure.

In this embodiment of the present disclosure, the communications terminal 1000 further includes multiple application programs and one or more programs. The multiple application programs and the one or more programs are stored in the memory 1040 and are configured for execution by the processor 1030. The one or more programs include an instruction. The processor 1030 performs the following operations by invoking the instruction in the one or more programs stored in the memory 1040.

In a first aspect, the instruction in the one or more programs is used to store a phone number, which is used to enable the communications terminal 1000 to obtain a unified access number, set the unified access number as root-level number information after the called party is successfully called for the first time according to the unified access number entered by a user, obtain information entered by the user according to an $n^{th}$ input prompt, set the information entered by the user according to the $n^{th}$ input prompt as sub-level n number information when the $n^{th}$ input prompt sent by the called party is received, where n≥1, and save the root-level number information, the sub-level n number information, and a relationship between the root-level number information and the sub-level number information as a number record of the called party such that when the called party is called for the second time, the corresponding sub-level number information in the number record is automatically sent to the called party according to an input prompt of the called party.

Preferably, setting the information entered by the user according to the $n^{th}$ input prompt as sub-level n number information includes setting the information entered by the user according to the $n^{th}$ input prompt as the sub-level n number information when the information entered by the user according to the $n^{th}$ input prompt is not privacy information, or setting a preset privacy identifier as the sub-level n number information when the information entered by the user according to the $n^{th}$ input prompt is privacy information.

The instruction is further used to enable the communications terminal 1000 to obtain number version information sent by the called party, where the number version information is used to determine whether the input prompt of the called party is updated, and add the number version information to the number record of the called party.

The instruction is further used to enable the communications terminal 1000 to hierarchically display the root-level number information and the sub-level n number information in the number record according to the relationship between the root-level number information and the sub-level n number information in the number record.

The instruction is further used to enable the communications terminal 1000 to obtain text information represented by the sub-level n number information, add the text information represented by the sub-level n number information to the number record of the called party, and display the sub-level n number information and/or the text information represented by the sub-level n number information.

The number record of the called party is saved in the memory 1040 using a call record and/or an address book.

In a second aspect, the instruction in the one or more programs is used to dial a phone number. A number record of the called party is stored in the memory 1040 in advance. For example, the instruction in the one or more programs may be further used to enable the communications terminal to perform the foregoing steps in the first aspect in order to save the number record of the called party when the called party is called for the first time. In a second aspect, the instruction in the one or more programs is further used to enable the communications terminal 1000 to obtain, from the number record of the called party, root-level number information of the called party, number information of sub-levels 1 to j, and a relationship between the root-level number information and the number information of sub-levels 1 to j, where the root-level number information is a unified access number of the called party, and the sub-level j number information is information entered by a user according to a $j^{th}$ input prompt of the called party when the called party is successfully called for the first time, and j is determined by a preset rule or user selection and is less than or equal to a total quantity of sub-levels in the number record, call the called party for the second time according to the root-level number information, and send, according to a relationship between the root-level number information and sub-level i number information, the sub-level i number information corresponding to an $i^{th}$ input prompt of the called party after the second call succeeds, where i≥1 and i≤j.

Sending the sub-level i number information corresponding to an $i^{th}$ input prompt of the called party further includes sending the sub-level i number information in the number record to the called party after a delay of an $i^{th}$ preset time, or sending the sub-level i number information in the number record to the called party when an input prompt sent by the called party is received for the $i^{th}$ time, or sending the sub-level i number information in the number record to the called party when an input prompt sent by the called party is identified for the $i^{th}$ time by means of speech recognition.

Sending the sub-level i number information corresponding to an $i^{th}$ input prompt of the called party includes prompting the user to enter information, and sending the information entered by the user to the called party when the sub-level i number information corresponding to the $i^{th}$ input prompt of the called party is a preset privacy identifier, or sending the sub-level i number information to the called party when the sub-level i number information corresponding to the $i^{th}$ input prompt of the called party is not a preset privacy identifier.

More preferably, sending the sub-level i number information corresponding to an $i^{th}$ input prompt of the called party includes obtaining the sub-level i number information of the called party after a delay of an $i^{th}$ preset time, when the input prompt sent by the called party is received for the $i^{th}$ time, or when the input prompt sent by the called party is identified for the $i^{th}$ time by means of speech recognition, and prompting the user to enter information, and sending the information entered by the user to the called party when the sub-level i number information is a preset privacy identifier, or sending the sub-level i number information to the called party when the sub-level i number information is not a preset privacy identifier.

The number record includes number version information.

The instruction is further used to enable the communications terminal 1000 to obtain the number version information of the called party from the number record of the called party, where the number version information is saved in the number record of the called party when the called party is called for the first time, and display expiration prompt information to the user when it is determined according to the number version information that the input prompt of the called party is updated, or perform sending, according to a relationship between the root-level number information and sub-level i number information, the sub-level i number information corresponding to an $i^{th}$ input prompt of the called party when it is determined according to the number version information that the input prompt of the called party is not updated.

The number record of the called party is saved in the memory 1040 using a call record and/or an address book.

The foregoing instruction in the one or more programs may be used in the first aspect or the second aspect, or may be used in both the first aspect and the second aspect. The processor 1030 executes the instruction to implement an operation of storing and/or dialing a phone number.

The method disclosed in the foregoing embodiment of the present disclosure may also be applied in the processor 1030 or may be implemented by the processor 1030. The processor 1030 may be an integrated circuit chip and has a signal processing capability. In an implementation process, steps of the foregoing method may be completed using an integrated logical circuit of hardware in the processor 1030 or an instruction in one or more programs saved in a computer readable storage medium. The foregoing processor 1030 may be a general-purpose processor, a digital signal processor (DSP), an application-specific integrated circuit (ASIC), a field programmable gate array (FPGA), or another programmable logic device, a discrete gate or a transistor logic device, or a discrete hardware component, which may implement or perform the methods, the steps, and the logical block diagrams disclosed in this embodiment of the present disclosure. The general-purpose processor may be a microprocessor, or the processor 1030 may be any conventional processor, or the like. The steps of the method disclosed in this embodiment of the present disclosure may also be performed by a hardware decoding processor, or be performed by a combination of hardware in a decoding processor and the instruction in the one or more programs saved in the computer readable storage medium. The computer readable storage medium may be located in the memory 1040. The processor 1030 reads information in the memory 1040, and completes the steps of the foregoing method together with hardware of the processor 1030.

In the foregoing solution, a number record used in a process of calling a called party for a specific service is saved in advance. When the called party is called for the specific service for the second time, root-level number information that represents a unified access number of the called party and sub-level number information that represents information entered by a user according to an input prompt of the called party when the called party is called for the first time are obtained from the number record of the called party, and the called party is called according to the root-level number information. After the second call succeeds, the sub-level number information in the number record is automatically sent to the called party according to the input prompt of the called party. In this process, an automatic call to the service can be implemented, and the user does not need to manually enter information, thereby avoiding a complex input process and improving manipulation efficiency.

In the several implementation manners provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some the technical solutions may be implemented in the form of a software product. The software product is stored in a storage medium and includes several instructions for instructing a computer device (which may be a personal computer, a server, or a network device) or a processor to perform all or some of the steps of the methods described in the implementation manners of this application. The foregoing storage medium includes any medium that can store program code, such as a universal serial bus (USB) flash drive, a removable hard disk, a ROM, a RAM, a magnetic disk, or an optical disc.

What is claimed is:

1. A method for dialing a phone call via a communications terminal, comprising:
   receiving a call instruction from a user to call a service desk;
   calling a unified access number of the service desk;
   receiving a first input prompt after the call has succeeded;
   automatically sending a first number to the service desk based at least on the first input prompt;
   receiving a second input prompt;
   outputting a user prompt in response to the second input prompt;
   receiving a user input; and
   sending information associated with the user input to the service desk.

2. The method of claim 1, wherein automatically sending the first number to the service desk based at least on the first input prompt comprises:
   performing speech recognition on the first input prompt;
   determining that a first number is required to be automatically transmitted to the service desk based at least on the result of the speech recognition; and
   sending the first number to the service desk.

3. The method of claim 2, wherein performing the speech recognition on the first input prompt comprises identifying, by the recognition, whether the first input prompt includes words "please enter".

4. The method of claim 2, wherein sending the first number to the service desk comprises sending the first number to the service desk without requiring a manual input.

5. The method of claim 1, wherein outputting the user prompt comprises:

performing speech recognition on the second input prompt;
determining that a user prompt is required to be output based on the result of the speech recognition; and
outputting the user prompt.

6. The method of claim 5, wherein determining that the user prompt is required to be output based on the result of the speech recognition comprises determining whether the second input prompt includes privacy information based on the result of the speech recognition.

7. The method of claim 1, further comprising sending the first number to the service desk after a delay of a preset time.

8. The method of claim 1, further comprising:
   obtaining number version information of the service desk; and
   displaying expiration prompt information to the user when the input prompt of the service desk is updated according to the number version information.

9. The method of claim 1, wherein the unified access number of the service desk is saved using a call record or an address book.

10. The method of claim 1, wherein the unified access number of the service desk and the first number have a hierarchical relationship.

11. A communications terminal comprising:
    one or more processors; and
    a memory storing one or more programs and a first software application, wherein the one or more programs are configured to be executed by the one or more processors, and wherein the one or more programs include instructions for:
       receiving a call instruction from a user to call a service desk;
       calling a unified access number of the service desk;
       receiving a first input prompt after the call has succeeded;
       automatically sending a first number to the service desk based at least on the first input prompt;
       receiving a second input prompt;
       outputting a user prompt in response to the second input prompt;
       receiving a user input; and
       sending information associated with the user input to the service desk.

12. The communications terminal of claim 11, wherein automatically sending the first number to the service desk based at least on the first input prompt comprises:
    performing speech recognition on the first input prompt;
    determining that a first number is required to be automatically transmitted to the service desk based at least on the result of the speech recognition; and
    sending the first number to the service desk.

13. The communications terminal of claim 12, wherein performing the speech recognition on the first input prompt comprises identifying, by the speech recognition, whether the first input prompt includes words "please enter".

14. The communications terminal of claim 12, wherein sending the first number to the service desk comprises sending the first number to the service desk without requiring a manual input.

15. The communications terminal of claim 11, wherein outputting the user prompt comprises:
    performing speech recognition on the second input prompt;
    determining that a user prompt is required to be output based on the result of the speech recognition; and
    outputting the user prompt.

16. The communications terminal of claim 15, wherein determining that the user prompt is required to be output based on the result of the speech recognition comprises determining whether the second input prompt includes privacy information based on the result of the speech recognition.

17. The communications terminal of claim 11, wherein the one or more programs include instructions for sending the first number to the service desk after a delay of a preset time.

18. The communications terminal of claim 11, wherein the one or more programs further include instructions for:

obtaining number version information of the service desk; and displaying expiration prompt information to the user when the input prompt of the service desk is updated according to the number version information.

19. The communications terminal of claim 11, wherein the unified access number of the service desk is saved using a call record or an address book.

20. A non-transitory computer-readable medium storing computer instructions for dialing a phone call, wherein the instructions when executed by one or more processors, cause the one or more processors to perform steps of:

receiving a call instruction from a user to call a service desk;

calling a unified access number of the service desk;

receiving a first input prompt after the call has succeeded;

automatically sending a first number to the service desk based at least on the first input prompt;

receiving a second input prompt;

outputting a user prompt in response to the second input prompt;

receiving a user input; and sending information associated with the user input to the service desk.

* * * * *